United States Patent [19]

Flower

[11] Patent Number: 5,090,710
[45] Date of Patent: Feb. 25, 1992

[54] BRUSH SEALS

[75] Inventor: Ralph F. J. Flower, Devizes, England

[73] Assignee: Cross Manufacturing Company (1938) Limited, Bath, England

[21] Appl. No.: 556,865

[22] Filed: Jul. 23, 1990

Related U.S. Application Data

[63] Continuation of Ser. No. 200,009, May 27, 1988, abandoned.

[30] Foreign Application Priority Data

May 29, 1987 [GB] United Kingdom ............... 8712681

[51] Int. Cl.⁵ ........................................... F16J 15/447
[52] U.S. Cl. ..................... 277/53; 277/192; 277/193; 277/195
[58] Field of Search ........... 277/53, 192, 54, 55, 277/56, 57, 58, 24, 237 A, 1, 3, 29

[56] References Cited

U.S. PATENT DOCUMENTS

| | | | |
|---|---|---|---|
| 885,032 | 4/1908 | De Ferranti | 277/53 X |
| 1,419,927 | 6/1922 | Hodgkinson | 277/56 |
| 3,082,010 | 3/1963 | Morley et al. | 277/56 |
| 3,092,393 | 6/1963 | Morley et al. | 277/56 |
| 3,606,349 | 9/1971 | Petrie et al. | 277/57 |
| 3,917,150 | 11/1975 | Ferguson et al. | 277/53 |
| 4,084,919 | 4/1978 | Morris, Jr. et al. | 277/56 |
| 4,202,554 | 5/1980 | Snell | 277/53 |
| 4,274,575 | 6/1981 | Flower | 277/53 |
| 4,595,207 | 6/1986 | Popp | 277/53 |
| 4,678,113 | 7/1987 | Bridges et al. | 277/53 |

FOREIGN PATENT DOCUMENTS

| | | | |
|---|---|---|---|
| 113904 | 3/1929 | Austria | 277/53 |
| 433899 | 9/1926 | Fed. Rep. of Germany | 277/53 |
| 506899 | 8/1930 | Fed. Rep. of Germany | 277/53 |
| 2344666 | 3/1974 | Fed. Rep. of Germany | 277/53 |
| 280897 | 6/1928 | United Kingdom | 277/53 |
| 1417969 | 12/1975 | United Kingdom | 277/53 |

*Primary Examiner*—Allan N. Shoap

[57] ABSTRACT

A brush seal assembly for use in a gas turbine, jet engine or the like where a shaft which rotates at very high rates is to be sealed to a housing. The seal assembly has a plurality of brush seal elements each of which comprises a generally arcuate carrier and a plurality of bristles projecting therefrom. All of the brush seal elements are supported in the engine housing in a substantially continuous end-to-end manner with the bristles of the seal elements arranged to form a substantially continuous brush seal wiping against the shaft.

12 Claims, 3 Drawing Sheets

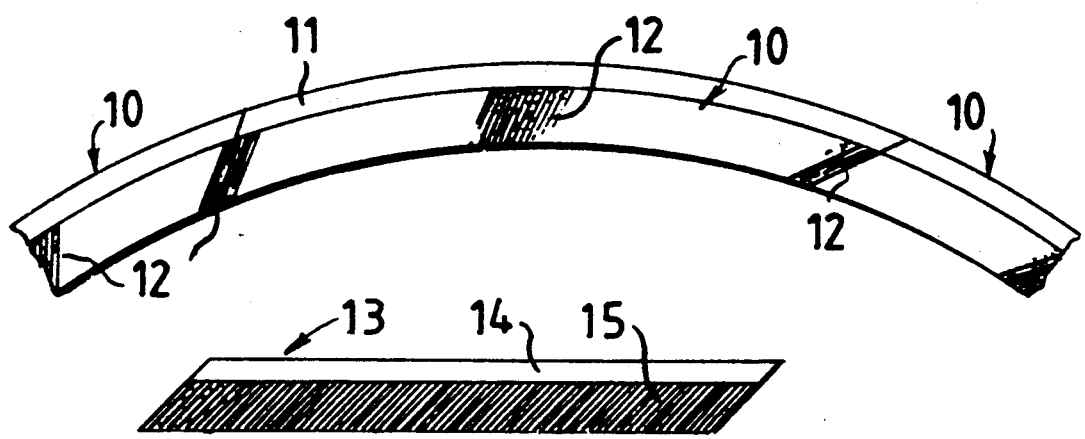
FIG.1
FIG.2
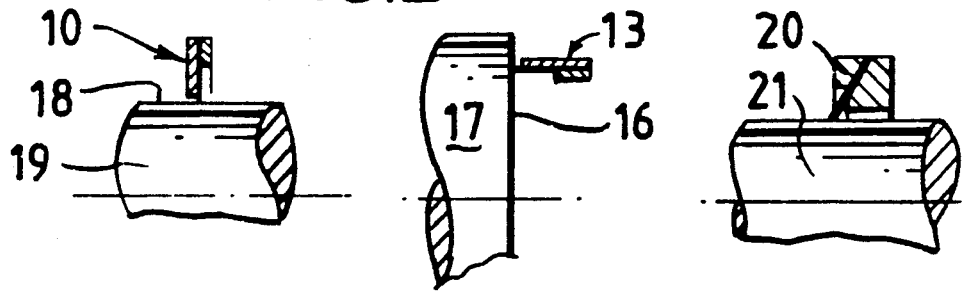
FIG.3A  FIG.3B  FIG.3C
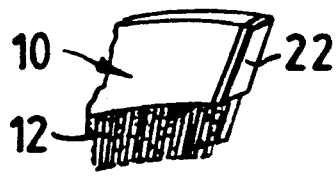 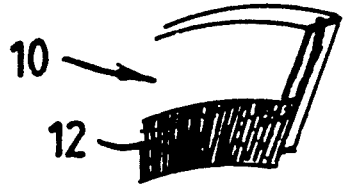
FIG.4A  FIG.4B

BRUSH SEALS This is a continuation of copending application Ser. No. 07/200,009 filed on May 27, 1988, now abandoned.

BACKGROUND OF THE INVENTION a) Field of the invention

This invention relates to a brush seal assembly suitable for effecting a seal between a housing and a shaft rotatable with respect to that housing.

b) Description of the Prior Art

In many machines, it is necessary for a seal to be effected between a housing and a shaft mounted for rotation with respect to the housing, for example to prevent the egress of lubricants out of the housing, or the ingress of foreign matter to bearings supporting the shaft. There have been innumerable designs for seals able to fulfill such functions, and the selection of an appropriate type of seal for a given set of operating conditions and circumstances does not normally present any great difficulty. However, a special problem arises in the case of a shaft which is intended to rotate at relatively high speeds, such as is encountered in gas turbines, jet engines and similar machines, to effect fluid (i.e. gas and/or liquid) seals either at the points where the shaft leaves the housing or between separate compartments within the machine. Such shafts may rotate at speeds as high as 100,000 rpm, and most conventional designs of seal are not suitable for use in these situations.

The problems of sealing shafts which are intended to rotate at very high rotational rates has led to the development of so-called brush seals, where an annular carrier is provided with bristles which, in the completed seal where the carrier is mounted co-axial with the shaft, have their tips wiping against the circumferential surface of the shaft. The bristles of a brush seal typically are made from a metallic wire and the seal has to be manufactured to very close radial tolerances, in order that an effective seal may be obtained without also causing heavy wear on the shaft, as a consequence of the tips of the bristles wiping the shaft surface. Moreover, for the same reasons the seal must be finished to a high order of circularity and must be mounted precisely concentrically with the shaft.

A brush seal equally may be designed for mounting on the shaft itself, with radially outwardly directed bristles to engage a suitable bore in the housing through which the shaft passes, but such seals are less commonly used in view o f the difficulties of satisfactorily mounting the seal on the shaft. Other possibilities include having the bristles extending parallel to the shaft axis, with the tips of the bristles sealing against a radial surface defined either by a shoulder on the shaft in the case of a seal mounted on a housing, or against an end face of the housing in the case of a seal mounted on the shaft.

As mentioned above, the known forms of brush seal are manufactured by providing an annular carrier on which are mounted the seal bristles, the seal then being machined to very close tolerances. When the seal is to be employed, it must be suitably mounted on the housing so as to surround the shaft and effect a seal thereagainst (for the usual seal configuration as described above) but this can be done only if there is access to the housing axially of the shaft, at the time the seal is to be fitted. The construction of certain engines therefore requires the seal to be fitted in place during assembly of the main components, rather than at the end of the assembly procedure. Moreover, should it be necessary to change the seal during the life of the machine, such axial access may necessitate most considerable dismantling of the machine. These difficulties may make the initial assembly of the machine - such as a large gas turbine or jet engine for an aircraft - difficult, especially if the shaft has to be assembled after the seal has been mounted on the housing which action itself may damage the seal. Also, if the seal is to be changed when the machine is in service, these difficulties may give rise to undesirably long service times.

OBJECTS OF THE INVENTION

It is a principal object of the present invention to provide an improved form of brush seal assembly, which seal assembly substantially reduces the disadvantages discussed above of known forms of brush seal, especially when the seal is used in the construction of a gas turbine or similar machine employing a shaft which rotates at a very high rate.

A further object of this invention is to provide a seal assembly for the shaft of a gas turbine, jet or the like engine, which seal assembly is easy to fit to effect a seal between the shaft and the engine housing, during the assembly of the engine.

Yet another object of this invention is to provide a seal assembly suitable for sealing the shaft of an engine which seal can be replaced with considerable ease without requiring axial access to the shaft, and so without the need to dismantle the engine.

Further objects and advantages of the present invention will be apparent from the following summary of the invention and the detailed description thereof.

SUMMARY OF THE INVENTION

In accordance with the foregoing and other objects of this invention, there is provided a brush seal assembly for effecting a seal between a fixed housing and a shaft rotatable with respect to the housing, which brush seal assembly comprises a plurality of separate brush seal elements each brush seal element having a base plate and a plurality of seal bristles carried by the base plate for effecting a seal against the shaft, and mounting means provided on the housing and adapted to hold the base plates of all said plurality of seal elements such that the seal elements are disposed in a continuous end-to-end relationship, with the bristles of each seal element arranged to form a substantially continuous brush seal.

It will be appreciated that when a brush seal is to be formed between a housing and a shaft rotatable with respect thereto using a seal assembly of this invention, each separate brush seal element may individually be assembled to the housing so that the complete annular brush seal is built up in situ around the shaft, rather than being formed remotely from the machine and then mounted thereon. This allows a much improved ease of assembly and moreover often may permit a much simplified seal-changing operation, for it may not be necessary to perform considerable dismantling of the machine - for example, depending upon the machine design, it may not be necessary to remove the shaft from the housing when changing seals. A further advantage is that should one element of the overall seal assembly become damaged or excessively worn, that seal element may selectively be replaced, without the need to replace the other seal elements at the same time.

BRIEF DESCRIPTION OF THE DRAWINGS

In order that the invention may better be understood, it will now be described in greater detail, and preferred features as well as certain specific embodiments of seal assemblies arranged in accordance with this invention will be described, with reference to the accompanying drawings. In the drawings:

FIG. 1 is a partial view of three seal elements of this invention, assembled together;

FIG. 2 is an axial view of an alternative form of seal element;

FIGS. 3A, 3B and 3C diagrammatically illustrate a seal effected by a seal assembly of this invention, on a shaft;

FIGS. 4A and 4B are detailed views showing the end portions of two seal elements of this invention;

DESCRIPTION OF THE PREFERRED EMBODIMENTS

Figure 5A:
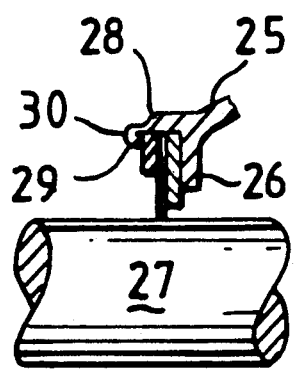
FIGS. 5A to 5G show seven different mounting means for securing seal elements to a housing, in accordance with this invention.

In a brush seal assembly of this invention, it is greatly preferred for the ends of each seal element to be complementarily formed, whereby one end of a first seal element may closely interengage the other end of the next seal element making up the complete brush seal assembly. For example, in the case of a brush seal assembly which defines a circular brush seal, each seal element may be of arcuate form with the end face of each arcuate seal element machined at some pre-determined angle to the radial direction, whereby the end faces may closely interengage. In one embodiment, each end face of each seal element may be machined at an angle of substantially 45° to the radial direction.

Each brush seal element may be provided with means to hold the bristles thereof in the required disposition until such time as the brush seal element is assembled to the housing with the other brush seal elements making up the complete brush seal. Such means may comprise a plate suitably welded, brazed or otherwise secured in position across the end of the brush seal element, to ensure the bristles of the element maintain their required disposition. An alternative would be to fuse the carrier ends of the bristles together, at each end of the seal element, for instance by soldering, brazing or by some other suitable non-metallic medium, depending upon the nature of the bristles themselves.

The mounting means provided on the housing preferably includes a pair of faces against which each brush seal element is engaged, to maintain each brush seal element in the required position both in the radial and axial directions. Once so located, each brush seal may be retained in the required position by any conventional means employed for similar purposes—that is, in retaining a seal in a housing. For example, a portion of the housing may include a lip which may locally be deformed to hold each seal element, or which may continuously be deformed around the entire seal, again to hold each element. Alternatively, a separate clamp ring may be employed, held in place for example by means of screw-threaded fasteners, rivets, or spot, seam or similar welds. Yet another possibility would be to retain the seal elements in position by means of a suitable spring retaining ring such as a circlip, itself received in a groove formed in the housing.

For the case of a seal assembly where the individual seal elements are held in place by means of a separate ring, it is preferred for there to be a mechanical interengagement between that separate ring and the seal elements. Preferably, the ring includes a projecting rib which is engageable in a groove formed in each seal element, such that a continuous annular groove is defined by all of the assembled seal elements. Conversely, a rib could be formed on each seal element, engageable in a groove in the clamp ring, or even in the housing.

In order to enhance the sealing effect obtainable by a brush seal assembly of the present invention, the seal assembly may include brush seal elements located axially side-by-side, in which case means should be provided to interconnect the individual seal elements of the axially adjacent brush seals. Again, use may be made of interengaging ribs and grooves, formed respectively on abutting faces of the individual seal elements. For a brush seal constructed in this way, it is preferred for the abutting ends of the brush seal elements to be staggered circumferentially whereby an adequate seal may be obtained at the abutting faces between adjacent seal elements in the same radial plane.

Figure 9:
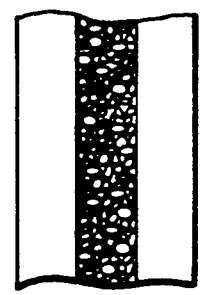
FIG. 9 is a partial schematic view of a seal element looking towards the carrier showing the ends of the bristles, with bristles of noncircular cross-section.

The sealing effect provided by the brush seal assembly of this invention may be enhanced by utilizing seal bristles of differing diameters, around the length of the seal assembly. For example, bristles of one diameter may be employed over the greater part of each seal element, and bristles of a different diameter (typically smaller) at each end of each seal element, to facilitate co-operation between the bristles of adjacent seal elements. Alternatively, the bristle diameters may be mixed over the entire length of each seal element, and so over the entire circumferential length of the assembled brush seal. A further possibility is to employ bristles of a non-uniform cross-sectional shape, such as oval, or elliptical as schematically shown in FIG. 9, or bristles of different materials. These aspects may assist the sealing effect where the bristles contact a part of the shaft which is not truly cylindrical—for instance, a shoulder of part-spherical shape.

Certain specific embodiments will now be described, which embodiments incorporate some of the preferred features as discussed above.

Referring initially to FIG. 1, there is shown in part a seal assembly of this invention, as assembled from a plurality of brush seal elements 10, each of arcuate form. Each brush seal element 10 comprises an annular carrier 11 on which is mounted a plurality of bristles 12 adapted to effect a seal to a shaft (not shown) when the seal elements are assembled to a housing. The bristles 12 lie at a fixed angle to the radial direction, determined from a consideration of the operating conditions for the seal. The end planes of each seal element are machined to the same angle with respect to the radial direction as are the bristles mounted on the carrier 11, so that the brush seal elements 10 may closely be assembled together and the bristles 12 may form a substantially continuous annulus.

Figure 7:
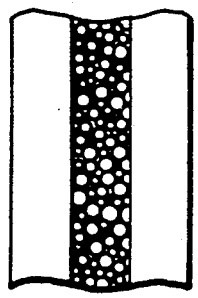
FIG. 7 is a partial schematic view of a seal element looking towards the carrier showing the ends of the bristles, with the bristles of nonuniform diameter.

The bristles themselves may be made of any suitable material, having regard to the service conditions for the seal. The bristles may be metallic or non-metallic, and may include a mixture of different bristle diameters as schematically shown in FIG. 7, in order to give the optimum sealing and stiffness properties to the overall seal, when completed.

FIG. 2 shows an alternative form of seal element 13. Here, the carrier 14 is linear, and again carries bristles 15 disposed at a fixed angle to the length of the carrier. Such a seal element may be employed when a seal is to be effected against a radial face 16 defined by a shoulder 17 on a shaft, as illustrated in Figure 3B, rather than on a cylindrical surface 18 of a shaft 19, as illustrated in FIG. 3A. For a seal such as is shown in FIG. 3A, a seal assembly as depicted in FIG. 1 would be employed.

FIG. 3C shows an alternative arrangement, where the brush seal 20 is set at an angle to the radial plane of the shaft 21, but the seal still is effected to the cylindrical shaft surface.

In order to retain the bristles properly in their required position at the end of each seal element, prior to the seal elements being assembled together, it may be necessary to contain the bristles for example by securing a plate 22 in position across the end of the seal element 10, as illustrated in FIG. 4A. The plate may be welded or brazed in position, depending upon the materials from which the seal element is made. Alternatively, as illustrated in FIG. 4B, the bristles may be fused together by a soldering or brazing operation, or by a suitable non-metallic medium, again depending upon the nature of the bristles.

The housing should appropriately be configured to hold all of the brush seal elements in the required disposition and FIGS. 5A to 5G show seven examples of housing configurations suitable for holding brush seal elements essentially as illustrated in FIG. 1. In the configuration of FIG. 5A, the housing 25 includes a first leg 26 extending in a generally radial plane with respect to the shaft 27, and a second limb 28 defining a cylindrical surface co-axial with the shaft 27. The free edge 29 of the limb 28 is suitably formed so that the edge may be rolled over to engage a lip 30 formed on the seal elements, such that those seal elements are held closely against the surfaces defined by limbs 26 and 28.

Figure 5B:
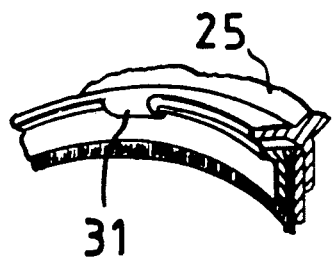

The arrangement of FIG. 5B is similar that of FIG. 5A, except that free edge of limb 28 here is deformed only locally at 31 to engage the seal elements, there being at least on such local deformation for each seal element.

Figure 5C:
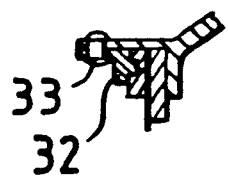
Figure 5D:
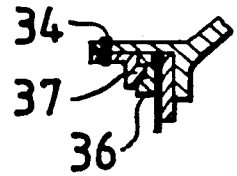
Figure 5E:
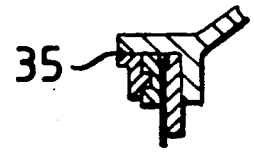

In the arrangements of FIGS. 5C, 5D and 5E, separate clamp rings are provided to engage the seal elements and hold those elements in the required positions against limbs 26 and 28 of the housing 25. In the arrangement of FIG. 5C, the ring 32 is held in place by rivets 33, in FIG. 5D by means of spot or seam welds 34, and in FIG. 5E by means of tack or continuous welds 35. In each of these arrangements, the seal elements include a groove formed in radial face 36, which groove is engaged by a rib 37, provided on the separate clamp ring.

Figure 5F:
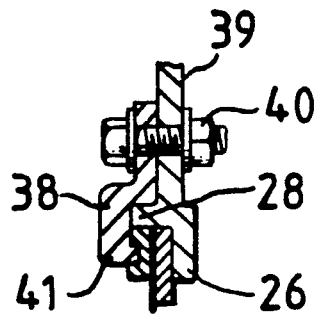

The arrangement of FIG. 5F employs an annular cover plate 38 attached to the housing 39 by means of screw-threaded fasteners 40, the cover plate including a flange 41 which serves to hold the seal elements closely against limbs 26 and 28 of the housing.

Figure 5G:
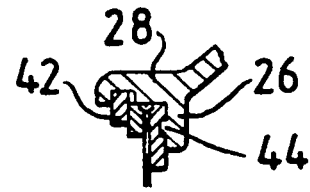

The use of a suitable spring retaining ring or circlip 42 is illustrated in FIG. 5G, this ring 42 being engaged in a groove 43 formed in an extension of limb 28 of the housing In this configuration, limb 26 is provided with an annular rib 44 which rib is engaged with correspondingly-formed grooves in each seal element, so as to retain the seal elements in the required position within the housing.

Figure 6:
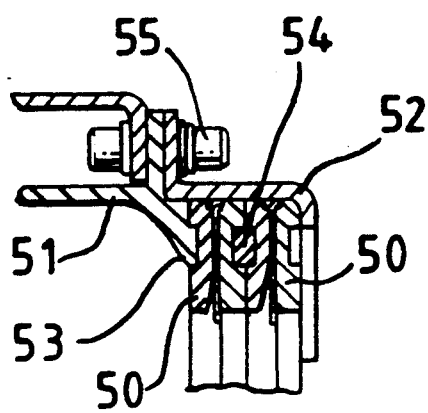
FIG. 6 is a sectional view through a further seal assembly of this invention, with the shaft omitted for clarity.

FIG. 6 shows a cross-section through an alternative form of seal assembly of this invention, where two radially parallel rows of brush seals are provided, to seal against a shaft. The seal is constructed from two sets of essentially similar seal elements 50, these seal elements being retained in a side-by-side disposition to a housing 51 by means of a clamp ring 52. The housing 51 includes a tongue 53 which engages an annular groove formed in one set of the brush seal elements, and a plurality of loose segmental keys 54 is provided to lock together the two sets of brush seal elements, the keys being engaged in corresponding grooves formed in the mating faces of the brush seal elements of the two sets. The clamp ring 52 is held to the housing 51 by means of screw-threaded fasteners 55 and serves to hold all of the brush seal elements of in the required disposition. In this arrangement, the joints between adjacent brush seal elements of one set should be staggered with respect to the joins between the elements of the other set, so as to optimise the sealing characteristics.

Figure 8:
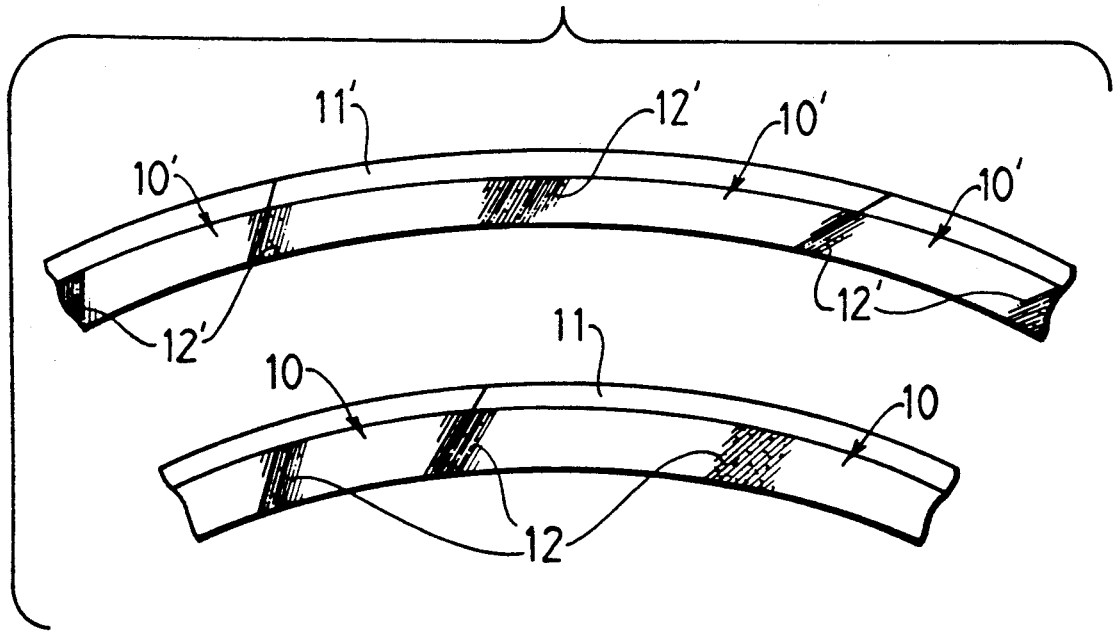
FIG. 8 is a fragmented schematic view of two sets of radially parallel seal elements arranged axially side by side as in FIG. 6 with the abutting ends of the brush seal elements being staggered circumferentially.

FIG. 8 schematically shows the staggered relationship between the joints or end plates of one set of brush sal elements ad those of another set which are radially parallel and axially side by side as shown in FIG. 6.

It will be apparent to those skilled in the art that various changes and modifications may be made to the embodiments described above whilst still falling within the spirit and scope of the present invention.

I claim:

1. A brush seal assembly for effecting a seal between a fixed housing of a gas turbine engine and a shaft rotatable with respect to the housing, which brush seal assembly comprises an annular seal member assembled from a plurality of separate interfitting arcuate brush seal portions, each said brush seal portion having an arcuate carrier and a plurality of seal bristles carried by said carrier for effecting a seal against the shaft, and mounting means provided on said housing and adapted to hold the carriers of all said plurality of arcuate seal portions such that the seal portions are disposed in a continuous end-to-end relationship defining said annular seal member with said bristles of each said seal portion arranged to form a substantially continuous brush seal, said carriers having end-plates formed to coact with the ends of adjacent arcuate base plates so that the bristles juxtapose to the ends of adjacent carriers to form a substantially continuous brush seal.

2. A brush seal assembly according to claim 1, in which the ends of each said seal portion are complementarily formed, whereby one end of a first seal portion abuts the other end of the next adjacent seal portion.

3. A brush seal assembly according to claim 2, in which each end plate of each seal portion is disposed at an angle of substantially 45° to the radial direction.

4. A brush seal assembly according to claim 1, in which each brush seal portion forms a self-contained unit with the bristles disposed in a required position.

5. A brush seal assembly according to claim 1, in which said mounting means includes a pair of faces against which each brush seal portion is engaged to maintain each said brush seal portion in the required position both in the radial and axial directions.

6. A brush seal assembly according to claim 5, in which the mounting means includes a separate ring which serves to hold said seal portions in place, the separate ring being formed to provide a mechanical interlocking interengagement with said seal portions.

7. A brush seal assembly according to claim 6, in which a projecting rig is formed in one of the ring and the assembled seal portions, which rib is engageable in the other of said ring and said assembled seal portions.

8. A brush seal assembly according to claim 1, in which the bristles of each seal portion are of more than one diameter.

9. A brush seal assembly according to claim 1, in which the bristles of each seal portion are of non-circular cross-sectional shapes.

10. A composite brush seal assembly for effecting a seal between a fixed housing of a gas turbine engine and a shaft rotatable with respect to the housing, which composite brush seal assembly comprises a plurality of annular separate interfitting arcuate brush seal portions, each said brush seal portion having a carrier and a plurality of seal bristles carried by said carrier for effecting a seal against the shaft, and mounting means provided on said housing which mounting means is adapted to hold the carriers of all said plurality of seal portions in two series arranged axially side-by-side, the seal portions of each series being disposed in a continuous end-to-end relationship with said bristles of each said seal portion in said series arranged to form a substantially continuous brush seal, said carriers having end-plates formed to coact with the ends of adjacent arcuate carriers so that the bristles juxtaposed to the ends of adjacent carriers form a substantially continuous brush seal.

11. A composite brush seal assembly according to claim 10, in which the abutting ends of the brush seal portions in said two series are staggered circumferentially.

12. A brush seal assembly according to claim 10, in which the bristles of each seal portion are of more than one diameter.

* * * * *